US012430480B2

(12) United States Patent
Wendelberger

(10) Patent No.: US 12,430,480 B2
(45) Date of Patent: Sep. 30, 2025

(54) METHOD FOR AUTOMATICALLY INTERPRETING A PIPING DIAGRAM

(71) Applicant: Siemens Aktiengesellschaft, Munich (DE)

(72) Inventor: Klaus Wendelberger, St. Leon-Rot (DE)

(73) Assignee: Siemens Aktiengesellschaft, Munich (DE)

(*) Notice: Subject to any disclaimer, the term of this patent is extended or adjusted under 35 U.S.C. 154(b) by 978 days.

(21) Appl. No.: 17/436,170

(22) PCT Filed: Feb. 26, 2020

(86) PCT No.: PCT/EP2020/055014
§ 371 (c)(1),
(2) Date: Sep. 3, 2021

(87) PCT Pub. No.: WO2020/178095
PCT Pub. Date: Sep. 10, 2020

(65) Prior Publication Data
US 2022/0138369 A1 May 5, 2022

(30) Foreign Application Priority Data
Mar. 5, 2019 (EP) .................... 19160877

(51) Int. Cl.
*G06F 30/18* (2020.01)
*G06F 113/14* (2020.01)
*G06F 119/02* (2020.01)

(52) U.S. Cl.
CPC .......... *G06F 30/18* (2020.01); *G06F 2113/14* (2020.01); *G06F 2119/02* (2020.01)

(58) Field of Classification Search
CPC ... G06F 30/18; G06F 2113/14; G06F 2119/02
See application file for complete search history.

(56) References Cited

U.S. PATENT DOCUMENTS

2009/0282067 A1  11/2009 Bendigeri et al.
2016/0161930 A1* 6/2016 Jirkovský .............. G05B 17/02
                                               700/29
(Continued)

FOREIGN PATENT DOCUMENTS

DE      102008063684       6/2010
EP         1876553         1/2008
(Continued)

OTHER PUBLICATIONS

PCT International Search Report dated Jun. 17, 2020 based on PCT/EP2020/055014 filed Feb. 26, 2020.

*Primary Examiner* — Chuen-Meei Gan
(74) *Attorney, Agent, or Firm* — Cozen O'Connor

(57) ABSTRACT

A method for automatically interpreting a piping diagram comprising objects, wherein at least two objects are each linked with operational requirements, an operational requirement is defined based on a predefined set of operating principles and based on a predefined set of boundary conditions, the operational requirements included in the piping diagram are successively evaluated during the automatic interpretation, an automation function is generated for an operational requirement and at least based on an operating principle that is included as an intended purpose in the operational requirement, and the automation function is connected to the objects linked via the underlying operational requirement.

5 Claims, 6 Drawing Sheets

(56) References Cited

U.S. PATENT DOCUMENTS

2018/0067462 A1* 3/2018 De ............... G05B 19/0426
2018/0314222 A1* 11/2018 Hoernicke ......... G05B 19/0426

FOREIGN PATENT DOCUMENTS

| EP | 3029535 | 6/2016 |
|---|---|---|
| WO | WO 00/20934 | 4/2000 |
| WO | 2017076420 | 5/2017 |

* cited by examiner

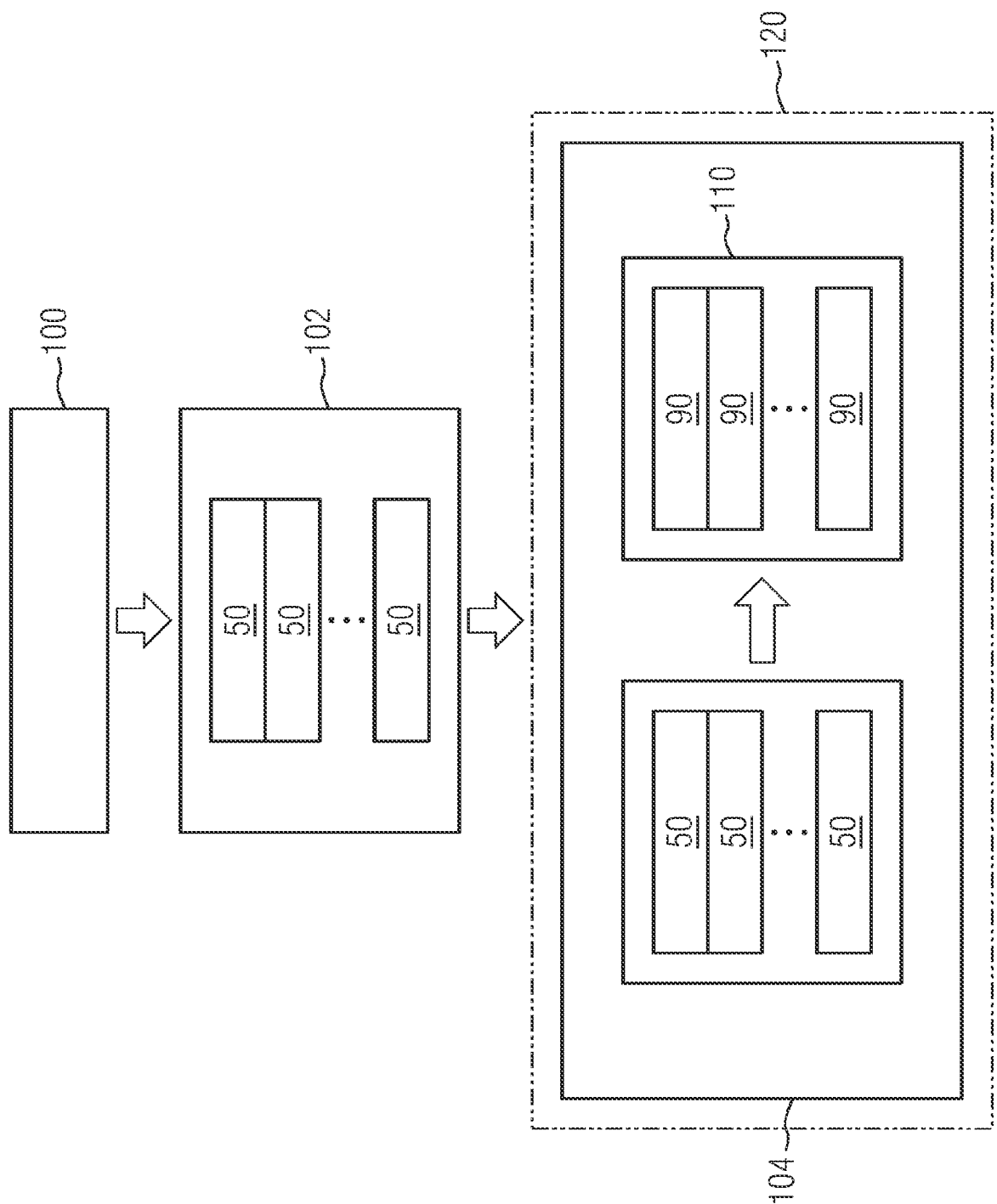

METHOD FOR AUTOMATICALLY INTERPRETING A PIPING DIAGRAM

CROSS-REFERENCE TO RELATED APPLICATIONS

This is a U.S. national stage of application No. PCT/EP2020/055014 filed 26 Feb. 2020. Priority is claimed on European Application No. 19160877.7 filed 5 Mar. 2019, the content of which is incorporated herein by reference in its entirety.

BACKGROUND OF THE INVENTION

1. Field of the Invention

The invention relates to a method for automatically interpreting a piping diagram, specifically a piping diagram in the form of a piping and instrumentation diagram (P&ID), in particular for process engineering plants or power stations.

2. Description of the Related Art

Piping diagrams are employed in a generally per se known manner for project design, planning and configuration of a specific process engineering plant.

The term plant also encompasses a subplant of a larger plant, for example a subplant intended for heating or cooling within a larger plant, as well as a plant part, i.e., a mixer unit, for example.

In a process engineering plant, a distinction can be made between primary technology and secondary technology. The primary technology comprises the construction of the plant from the process engineering or technological viewpoint, i.e., the process engineering components of the plant, such as containers, pumps, valves, heat exchangers, and their interconnection, in particular pipes. The secondary technology enhances the primary technology to ensure operation of the plant according to specifications, where different secondary technologies fulfill different functions during the operation of the plant.

The planning or project control and configuration of the primary technology is realized by means of a plant planning tool (e.g., COMOS from Siemens) in the form of a production of a process flow or piping and instrumentation diagram (P&ID drawing) of the plant, where graphical process objects representing components of the process engineering plant are linked with one another. The actual process objects (instances of object classes) contain technical information about the parameters of the components represented by them, such as pipe diameters, power consumption of motors or the fill volume of a container. The P&ID diagram may also already contain the sensors and actuators (measuring transducers and drives for final control elements) of the plant together with the technical information relating to the sensors and actuators, or the corresponding information can be input into the plant planning tool.

An important secondary technology is represented by the automation of the plant, which in turn can be subdivided into different subareas such as automation software, automation hardware and operator control and monitoring, whose solutions in the past were often planned, designed and configured by different technical experts (automation engineers, project managers) such as hardware engineers, software engineers, or Human Machine interface (HMI) engineers.

In addition to automation, the electrification of the plant is important as a further secondary technology. All the electrical plant components, such as in particular the motors, must be supplied with electric current. To that end, it is necessary to provide the requisite electrification components, such as transformers, inverters, or switcher.

Building technology or telecommunications should be mentioned as examples of further secondary technologies.

The basic step in the planning of a process engineering plant is the production of a piping diagram.

The piping diagram comprises all the process engineering components of the plant, such as containers, pumps, fans, drives, and/or sensors, as weld as the pipes via which the components are connected to one another, and these are represented in the piping diagram. According co the current state of the art, such a piping diagram may already contain all the product-related information about the components of the plant. In the case of the sensors, this may be, for example, information relating to a start of a measurement range and an end of a measurement range, a connection type (for example, Profibus, 4-20 mA wired), or a respective manufacturer. In the case of the pipes, this may be, for example, information, such as material, diameter, or wall thickness.

The rules governing how piping diagrams are to be constructed and used are laid down in various standards. The corresponding diagrams are specified and the graphical symbols to be used are defined in ISO 10628 (Diagrams for the chemical and petrochemical industry). IEC 62424 (Representation of process control engineering—Requests in P&I diagrams and data exchange between P&ID tools and PCE-CAE tools) defines requirements for piping diagrams and data exchange between plant planning tools and engineering tools for automation systems.

In the applicant's company, the process of preparing a piping diagram configuration additionally entails including operational requirements and specifications for the plant to be constructed in a piping diagram. This step is referred to as configuration (configuration of the piping diagram) and the result is a configured piping diagram.

Whereas the piping diagram originally describes only of which components a process engineering plant consists and how these are connected to one another, the configured piping diagram additionally contains information concerning how the plant is to be operated in manual mode (manual operation) and in automatic mode (automated operation). The configuration of a piping diagram is the basis for a completely automatic production of engineering documentation in the field of automation and electrification.

Even today, the operational requirements of a planned plant must be defined. Otherwise, engineering an automation of the respective plant and electrification of the plant would not be possible.

How piping diagrams are to be constructed is described in the above-cited IEC 62424 standard. It is also described therein inter alia that limit values of signals can be indicated in a piping diagram. It is furthermore described that the functional relationships between sensors and actuators can be expressed using symbols that represent automation functions. Overall, however, the P&ID is directed only at the general representation of certain important automation relationships.

The IEC 62424 standard explicitly contains the sentence "Detailed information on complex control functions shall not be part of the P&ID. Therefore, additional documentation (e.g., control narratives, function charts) has to be prepared to define the required functionality."

Accordingly, information on operational requirements is defined in the prior art in parallel with the piping diagram in separate documents (texts, tables, function block diagrams, or drawings), i.e., independently of the piping diagram. In which form and in which format such documents are made available, is very largely dependent on the respective producer and equally on the respective field of engineering (closed-loop control, open-loop control, operator control and monitoring, or protection).

In the approach proposed herein, it is provided that operational requirements are specified as an integral part of a piping diagram. This makes information about the operational requirements immediately available and accessible to automatic interpretation. In the prior art, producing an overall view of a piping diagram comprising at least one document of the aforementioned type is always performed as an intellectual activity by a human expert.

SUMMARY OF THE INVENTION

In view of the foregoing, it is accordingly an object of the present invention to provide a method that enables an automatic Interpretation of a piping diagram (P&I diagram) of a technical plant, in particular to provide a method in which automation functions are generated automatically within the scope of the automatic interpretation of a piping diagram, where the automation functions transform the operational requirements included in the piping diagram into software and can be incorporated into an automation software solution for automating the respective plant.

This and other objects and advantages are achieved in accordance with the invention by a method and a computer program comprising an implementation of the method, where the approach proposed herein is preferably considered suitable for process engineering plants or power stations.

A piping diagram comprises, in a per se known manner, objects as representatives of plant components and connections between objects as representatives of connections between plant components, where each connection is itself in turn an object (a specific object) in the piping diagram.

The objects are already named in the course of producing the piping diagram or at least are named in the course of configuring the piping diagram. In order to include a representative of a valve of a plant in a piping diagram, a corresponding data object is selected from a library, for example, (by a human expert), which leads at least to a symbolic representation of a valve in the piping diagram. The data object is connected to an object type, in this case, for example, "valve". The same applies analogously to other technical units of a plant and to an object which represents a unit in each case.

In the method proposed herein, objects and/or connections of a piping diagram are linked with operational requirements. The operational requirements are defined based on a predefined set of operating principles (operating principle of the operational requirement) and also based on a predefined set of boundary conditions (boundary condition of the operational requirement). The sets on which the usable operating principles and boundary conditions are based ensure a representation of any operational requirement that can be evaluated electronically. The sets define to a certain extent a vocabulary that is available for formulating an operational requirement, and thus a permanent and limited vocabulary with which any operational requirement is formulated.

In the automatic interpretation of the piping diagram, the operational requirements included in the piping diagram are evaluated successively. In the course of the evaluation, an automation function is generated for an operational requirement automatically and at least on the basis of an operating principle that is included as an intended purpose in the respective operational requirement, i.e., an implementation of the function that is to be realized according to the respective operational requirement in software, i.e., in executable program code which, when executed via an automation system, causes a realization of the function that is to be realized according to the operational requirement.

An operating principle that is selectable in a definition of an operational requirement states for example "is controlled by". This operating principle implies the need for a feedback control for a transformation of the operational requirement into software. The resulting automation function therefore comprises at least one control function. To ensure the control action precisely implements the originally defined operational requirement, i.e., for example, the regulation of a flow rate via a control valve, the automation function, and in general any automation function generated automatically in each case, is connected to the objects linked via the underlying operational requirement. This connection to the objects linked via the operational requirement can exist in the form of a connection to the objects included in the piping diagram and/or in the form of a connection to the real units represented by the objects of the piping diagram.

The linking of operational requirements with elements (objects and/or connections) of the piping diagram may be implemented within the scope of the method or may have already been completed beforehand. Defined operational requirements are notwithstanding a prerequisite for all other steps of the method proposed herein.

The method is realized for automatic execution in the form of a computer program, referred to hereinbelow as an engineering tool, or, where appropriate, as a distributed computer program that comprises an implementation of the method proposed herein and serves as a way to perform the method proposed herein. The invention is therefore a computer program comprising program code instructions that are executable by a computer, referred to in the following as an engineering system, or, where appropriate, by a distributed computer system, and are executed during operation, and also a storage medium having a computer program of this type stored thereon, i.e., a computer program product comprising program code instructions, and finally also an engineering system into the memory of which such a computer program is loaded or can be loaded as a way to perform the method in accordance with disclosed embodiments.

The computer program (engineering tool) acting as an implementation of the method proposed herein or the computer program comprising an implementation of the method proposed herein is executed on the engineering system and via the engineering system. The engineering tool may also comprise functions for drafting and editing a piping diagram or the complete customary set of functions for drafting and editing a piping diagram and thus becomes a complete engineering environment.

When method steps or method step sequences are described here and in the following, this relates to actions performed based on the computer program or under the control of the computer program (on the basis of the engineering tool or under the control of the engineering tool), unless it is explicitly indicated that individual actions are initiated by a user of the engineering tool. At any rate, any use of the term "automatic" means that the action in question is executed on the basis of the engineering tool or under the control of the engineering tool.

An important advantage of the present invention resides in the fact that algorithms for transforming the operational requirements in the field of the secondary technology are generated automatically based on a definition of operational requirements, in particular operational requirements included in the piping diagram, i.e., in particular for automatic transformation of the operational requirements into automation software, i.e., for example, algorithms for implementing feedback control processes. A further advantage is that the underlying definition of the operational requirements can be produced in a technological manner, i.e., the plant planner defines the process engineering purpose of a component (e.g., heating, or mixing) without needing to have knowledge of how such a purpose is actually to be fulfilled in the field of the secondary technology. The foundation for the possibility of a technological definition of the operational requirements is created by the usability of a set of operating principles and a set of boundary conditions.

Optionally, the engineering tool (or a development environment comprising the functionality of the engineering tool) generates the operational requirements automatically, specifically on the basis of a user-defined process engineering purpose that is co be fulfilled by a particular plant component. If the user specifies, for example, that a particular valve is she minimum flow valve of a pump, then the corresponding operational requirements can be derived automatically therefrom.

In the case of redundant plant structures, in a special embodiment of the approach proposed herein, the user is simply required to define the presence of the redundancy as well as the operational requirements of the first structure. All further definitions, such as the determination of the redundancy partners of the individual components or the operational requirements of the further structures, are undertaken automatically by the engineering tool.

A clear simplification of plant planning, together with corresponding time and cost savings, is possible on the basis of the approach proposed herein. The method is performed in its entirety via precisely one software tool, specifically the engineering tool, so there is no longer any need for a data transfer to additional systems. This means that transmission errors and data inconsistencies that might otherwise be possible are avoided. In a corresponding execution, the engineering system can indicate to the user in an essentially optional manner at which points the definition of operational requirements is not yet complete. A significant increase in the quality of plant planning is achieved as a result.

To avoid unnecessary repetitions, it holds for the further description that features and details described in connection with the cited method for automatically interpreting a piping diagram self-evidently apply also to a computer program comprising an implementation of the method, and vice versa. Accordingly, the computer program (the engineering tool) may also be developed further by instructions, in particular program code instructions, for performing method steps executed within the scope of the method. Equally, the method may be developed further via method steps executed by the computer program. Consequently, features and details of the method always apply also to the corresponding computer program, and the computer program always also applies to the method, so that reference is or can be made on a reciprocal basis in all cases with regard to the disclosure in relation to the individual aspects of the invention.

In an embodiment of the method, an automation function is generated for an operational requirement and based on an operating principle included in the respective operational requirement, on the one hand, as well as on the basis of at least one boundary condition included in the same operational requirement, on the other hand. Taking an operating principle and at least one boundary condition into account in combination allows an even more precise specification of operational requirements, and an evaluation of the operating principle of an operational requirement in conjunction with the or each boundary condition included in the operational requirement ensures that such operational requirements are also transformed into an automation function.

In a further embodiment of the method, an automation function is generated for an operational requirement based on a database containing process instructions. The database comprises a plurality of process instructions, where precisely one process instruction is held available in the database for each operating principle or boundary condition included in an operational requirement (i.e., for any theoretically possible operating principle or boundary condition limited by the respective vocabulary) or each combination of an operating principle with at least one boundary condition. Each operational requirement can therefore be uniquely assigned to precisely one process instruction based on the respective operating principle and the or each associated boundary condition or, conversely, precisely one process instruction from the database containing process instructions can be each assigned to an operational requirement and its operating principle as well as to the or each associated boundary condition. During the automatic interpretation of the piping diagram and during a generation of an automation function for an operational requirement, there is selected, for each operational requirement from the database, that process instruction that matches the operational requirement, i.e., which fits the operating principle of the operational requirement or, i.e., which fits the operating principle of the operational requirement as well as the or each associated boundary condition. Each process instruction comprises at least one process step and each process step comprises one automatically evaluable definition for transforming an operating principle and the or each associated boundary condition into executable computer program instructions in the form of an automatically evaluable definition for the use of at least one automation technology building block and for transforming the or each respective building block and its or their use into executable computer program instructions. A process step or a sequence of process steps has automatically been selected by selection in each case of precisely one process instruction for an operational requirement. In an execution by the engineering tool, the step or steps automatically transform the operating principle to be realized based on the underlying operational requirement and, where applicable, the associated boundary condition to be realized into an automation function. A generated automation function forms or is added to a computer program, which, for differentiation purposes, is referred to as an automation computer program. The automation computer program, is the automation software or a part of the automation software for the respective plant. The automation computer program, and hence the automation software, comprises an implementation of the respective operational requirement performed by at least one process step selected from the database in the form of computer program instructions that are executable by means of an automation system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is explained in more detail below with reference to the drawing. Equivalent objects or elements are labeled with the same reference signs in all the figures, in which:

FIG. 7 shows a schematically simplified illustration representing a workflow of the method in accordance with the invention with intermediate results of the method and an automation computer program resulting on the basis of the method and comprising a plurality of automation functions of FIG. 5.

DETAILED DESCRIPTION OF THE EXEMPLARY EMBODIMENTS

Figure 1:
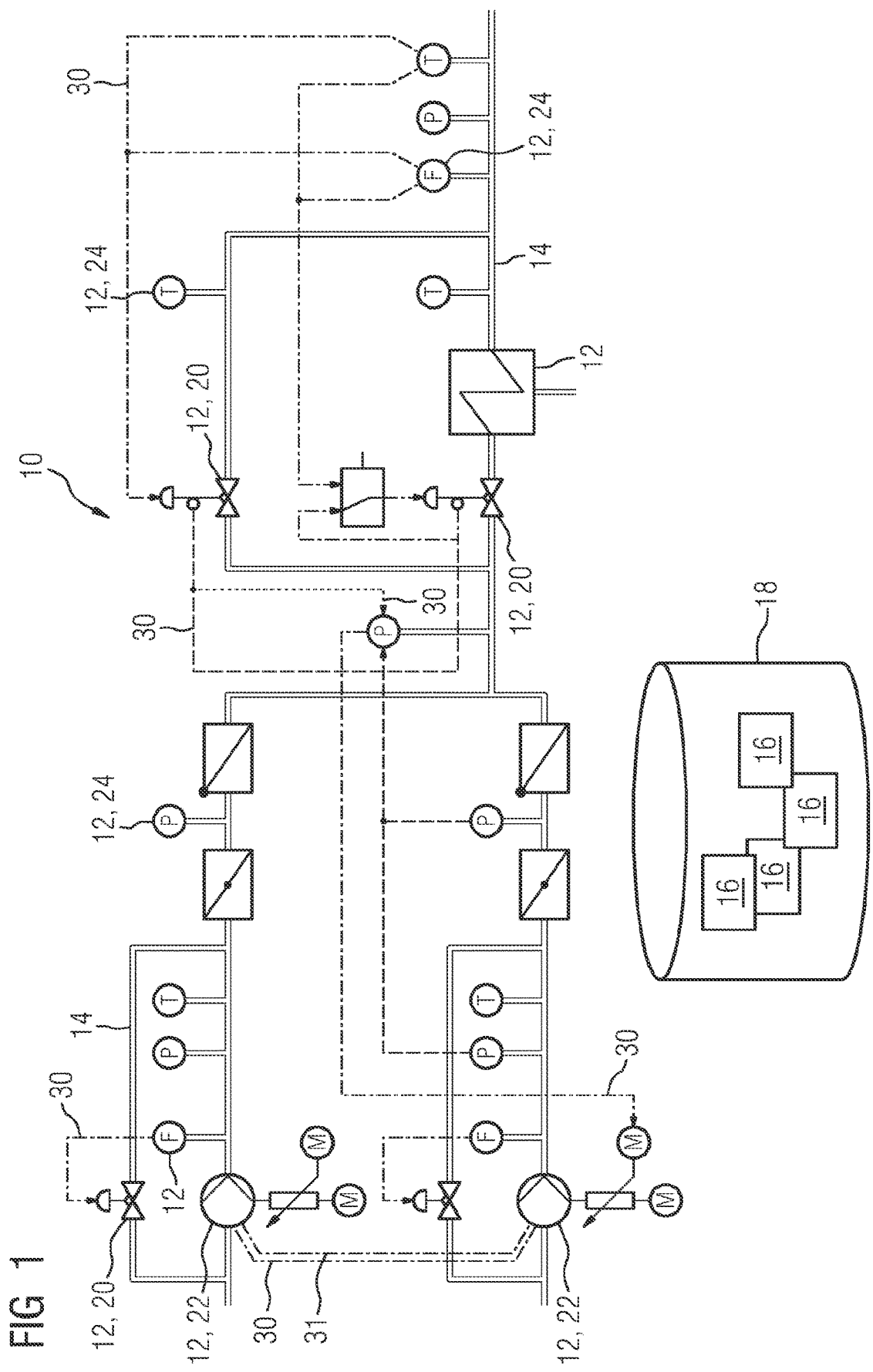
FIG. 1 shows a piping diagram containing objects, connections between objects and operational requirements in accordance with the invention.

The illustration in FIG. 1 shows by way of example a section from a piping diagram 10. The piping diagram 10 comprises, in a generally per se known manner, objects 12 (only individual ones designated) and connections 14 (likewise only individual ones designated) representing pipes or general fluidic connections between the objects 12.

Each object 12, in particular each object 12 and each connection 14 (connection 14 as a special form of an object 12), is based on an object type 16 in order to instantiate objects 12 on the basis of a respective object type 16 and to use instantiated objects 12 in a piping diagram 10, the usable object types 16 are held available in an object type database 18.

The object type database 18 acts as it were as a modular building-block system from which an object 12 can be extracted for use in a piping diagram 10. Extracting an object from the building-block system (from the object type database 18) entails selecting an object type 16, instantiating an object 12 based on the selected object type 16 and placing the instantiated object 12 in the piping diagram 10. Essentially, any number of objects 12 can be instantiated based on one and the same object type 16 (the "modular building-block system" does not run out).

Each object 12 used in a piping diagram 10 acts as a representative of a physical unit of the respective plant. The objects 12, 20, 22, 24 of the piping diagram 10 shown in FIG. 1 act, for example, as representatives of valves, pumps and a sensor system, namely as representatives of such units in a real technical plant, i.e., for example, an already existing plant or a plant yet to be constructed based on the piping diagram 10. In the interests of better readability of the further description, an object 12 acting as representative of a valve is itself referred to in the following as a valve 20 and the object 12, 20 is designated by a corresponding reference numeral. This also applies similarly to an object 12 acting as representative of a pump 22, as well as to an object 12 acting as representative of a sensor 24.

Figure 2:
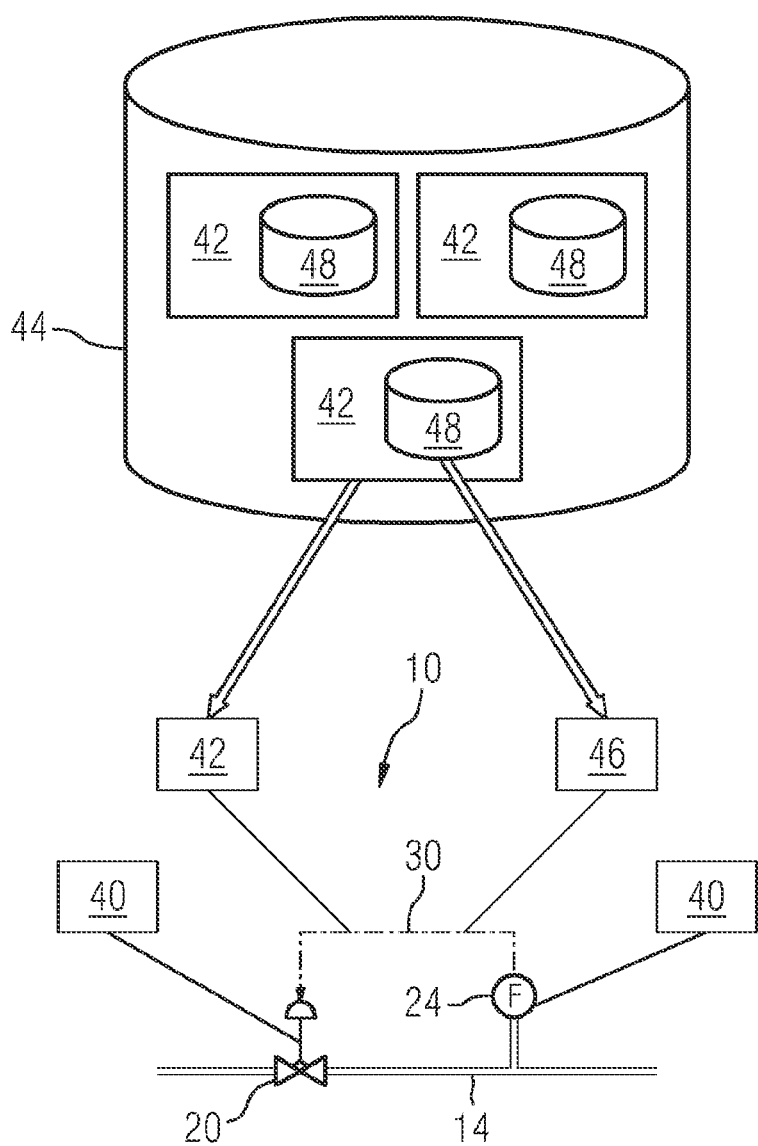
FIG. 2 shows a section of a piping diagram containing an operational requirement linked with two objects in accordance with the invention.

The illustration in FIG. 2 shows a section of a piping diagram 10 as in FIG. 1. The illustrated part of the piping diagram 10 comprises (as an object 12 of the piping diagram 10) a valve 20, specifically a control valve, and as a sensor system (as well as an object 12 of the piping diagram 10) a flow sensor referred co in the following as a sensor 24 for short. The valve 20 and the sensor 24 are connected via an operational requirement 30 represented in the form of an arrow. Operational requirements 30 are already shown in FIG. 1 (only individual ones designated).

The arrow representing an operational requirement 30 starts from an object 12 and points to another object 12. In the diagram shown in FIG. 2, the arrow representing the operational requirement 30 starts from the sensor 24 and points to the valve 20. This direction is part of the definition of the operational requirement 30 and means (the direction encodes) that data originating from the sensor 24 is to have an influence on the valve 20 (in this case: its state/position). Generally, the direction of an operational requirement 30 (the direction of an arrow representing the operational requirement 30) means that data of an object 12 from which the operational requirement 30 originates is intended to influence, directly or indirectly, a state of an object 12 at which the operational requirement 30 ends.

In a further expression of an operational requirement 30, the operational requirement establishes an undirected connection between objects 12 and is therefore represented in a connection without arrow. An undirected operational requirement 31 is already shown in FIG. 1. In this case the operational requirement 31 means that the states of the objects 12 that are connected to one another by way of the operational requirement 31 are intended to influence one another (e.g., two pumps 22 are to be operated at the same power).

An operational requirement 30, 31 is connected to at least two objects 12, in particular to precisely two objects 12. The fact that an operational requirement 30, 31 is connected to two objects 12 does not prevent one and the same object 12 from being able to be the starting point or end point of a plurality of operational requirements 30, 31. For example, the data originating; from one and the same sensor 24 can have an influence on the state of different objects 12. Equally, the state of one and the same object 12 can be influenced by the data originating from different other objects 12.

The fact that each object 12 is assigned a unique designation as a name 40 is exploited, for example, in order to connect an operational requirement 30, 31 to two objects 12. In the situation shown in FIG. 2, the designation "control valve 1" is used as the name 40 of the valve (control valve) 20, for example, and the designation "flow sensor 1" is used as the name 40 of the sensor (flow sensor) 21, for example. A name 40 used in a piping diagram 10 can only be used once in order to guarantee the uniqueness of the names 40.

An operational requirement 30, 31 specifies a possible way in which an object 12 is influenced on account of data of the respective other object 12. During the specification of an operational requirement 30, 31, precisely one type of influencing is selected as operating principle 42 from a predefined set 44 of influencing options. The set 44 is available in the form of a database. To provide better clarity of overview for the user, operational requirements 30, 31 that specify different operating principles are represented differently in the piping diagram 10, for example, through the use of different dine types. Operational requirements 30, 31 having different operating principles 42 and therefore different graphical representations are already shown in FIG. 1.

The operational requirement 30, 31 or at least an object 12, 20, 24 linked via the operational requirement 30, 31 is assigned one or more boundary conditions 46 from a predefined set 48 of possible boundary conditions 46. This set 48 is also available in the form of a database. The boundary condition 46 can be specified within the scope of the definition of the operational requirement 30, 31. Each operating principle 42 is assigned a specific number of possible boundary conditions. For example, a possible boundary condition 46 for the operating principle 42 "is controlled by" (cf. FIG. 2, in which the operational requirement 30 signifies that the flow sensor 24 is controlled with the aid of the control valve 20) is a predefined or predefinable setpoint value for the controlled variable. The operating principle "redundancy" (cf. the operational requirement 31 in FIG. 1, which signifies that the two pumps 22 are to be operated in a redundancy mode of operation) comprises as possible boundary condition 46 a specification of those signals (e.g., the power draws of the pumps 22) via which a synchronization of the objects 12, 22 affected is to be accomplished.

Figure 3:
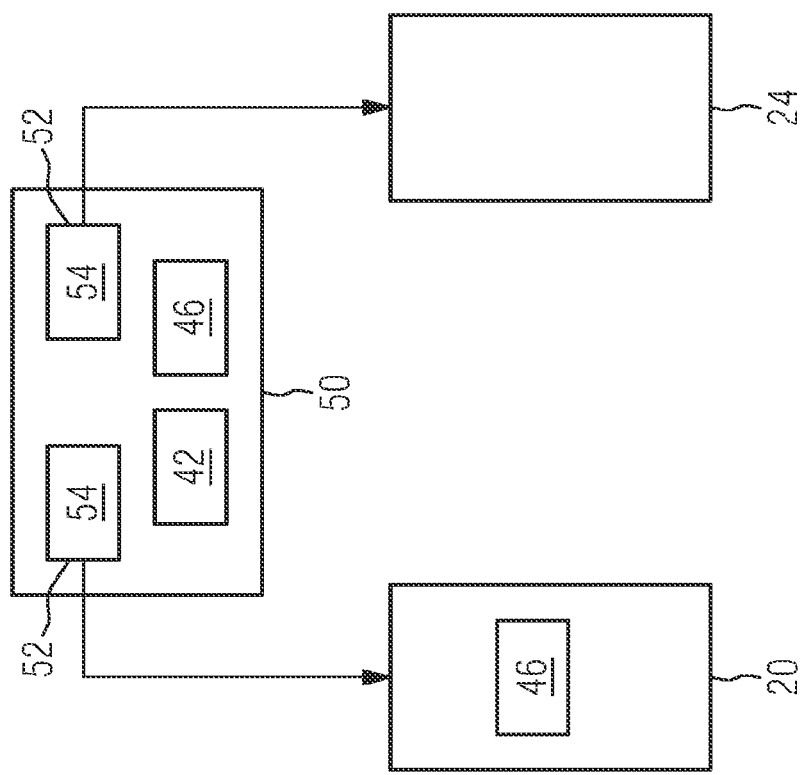
FIGS. 3 and 4 show schematically simplified illustrations of a data record resulting on the basis of an operational requirement and encoding the operational requirement in accordance with the invention.

In the situation shown in FIG. 2, the operational requirement 30 is linked with the valve 20 (object 12) and with the sensor 24 (object 12). The link is established, for example, via the names 40 of the objects 12, 20, 24. In order to reference the objects 12, 20, 24, a data record 50 encoding the operational requirement 30 then comprises the names 40 as reference 52, as is shown in schematically simplified form in FIG. 3. In addition or alternatively, the linking of the operational requirement 30 may also be realized in the form of a direct referencing of the objects 12, 20, 24 linked via the operational requirement 30.

Figure 4:
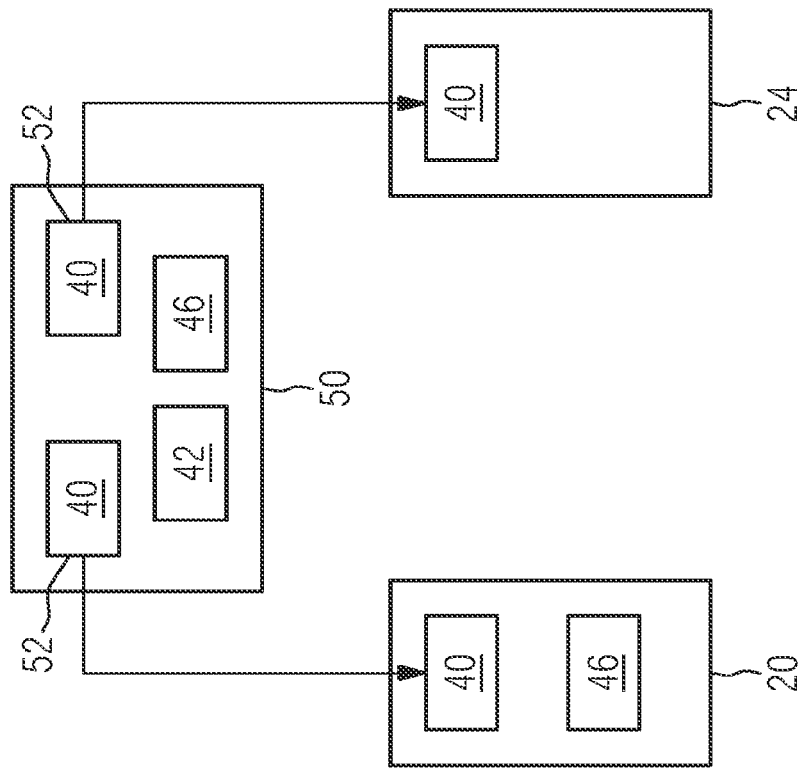

In that case, a data record 50 encoding the operational requirement 30 comprises, as reference 52, for example, the addresses (memory addresses) 54 of the linked objects 12, 20, 24, as is shown in schematically simplified form in FIG. 4.

Generally, a data record 50 encoding an operational requirement 30, 31 comprises references 52 of the objects 12, 20, 24 linked via the operational requirement 30, 31, in particular precisely one first reference 52 for referencing a first object 12, 21, and also precisely one second reference 52 for referencing a second object 12, 20.

In an evaluation of an operational requirement 30, 31 (an automatic evaluation of the data record 50 encoding the operational requirement 30, 31), it is automatically recognizable, based on the references 52, which objects 12, 20, 24 are linked with one another via the operational requirement 30, 31. Specifically, it is automatically recognizable which type of objects 12, 20, 24 are linked with one another. This is recognizable, for example, by the types (object types 16) of the respective objects 12, 20, 24 because a representation of a valve 20 in a piping diagram 10 requires an instantiation of an object 12, 20 based on a corresponding object type 16 and the underlying object type 16 is different from an object type 16, as is used for example for representing a pump 22. In addition or alternatively, the type of the respective object 12, 20, 24 is automatically recognizable based on a data element encoding the object type 16 and directly included in the respective object 12, 20, 24.

Based on the type of influencing that is specified via the operational requirement 30, 31, it can be established automatically, on the one hand, from which object 12, 24 the data that is essential for the influencing of the other object 12, 20 originates, and it can be established automatically, on the other hand, which object 12, 20 is influenced according to the data, and it can be established automatically by means of the operating principle 42 included in the operational requirement 30, 31 how the influencing is physically to be accomplished. It can therefore be established automatically which object 12, 21 in an operational requirement 30 acts as data source and which object 12, 20 in an operational requirement 30 acts as data sink. This also applies to an undirected operational requirement 31, for example, the operational requirement 31 in FIG. 1, in which each object 12, 20, 24 is both data source and data sink.

In the exemplary illustrated (FIG. 2), it is automatically recognizable in the manner outlined above that data relevant within the scope of the operational requirement 30 originates from a flow sensor (sensor 24) and is intended to influence a control valve (valve 20). The operating principle 42 included in the operational requirement 30 (the data record 50 encoding the operational requirement 30) determines how the data originating from the sensor 24 is to influence the valve 20. An operating principle 42 selected on the basis of the set 44, such as "is controlled by" for example, means that the measured value obtainable from the sensor 24 is to be controlled by changing the position of the valve 20. In this case, for example, a sign of the control loop is specified as boundary condition 46 of the operational requirement. For example, a positive sign means that the valve to be opened further whenever the measured value (actual value) originating from the sensor 24 falls below the setpoint value predefined as a further boundary condition 46, and the valve 20 is to be closed further whenever the measured value exceeds the setpoint value.

In the interests of better readability of the further description, the reference to a data record 50 encoding the operational requirement 30, 31 is dispensed with in the following and the data record 50 itself is referred to as the operational requirement 30, 31. This permits shorter formulations and is also justified objectively by the fact that one data record 50 results in each case based on one operational requirement 30, 31 in each case.

From the operational requirement 30, there results, as described above, the type of linking of the objects 12, 20, 24 linked via the operational requirement 30 based on the operating principle 42 included therein.

On the basis of the operating principle 42 (of a data element encoding the operating principle 42 and included in the data record 50) or, as the case may be, of the boundary condition 46 (of a data element encoding the boundary condition 46 and in the data record 50), a database 64 (FIG. 1 containing process instructions 66 (FIG. 5) is accessed for the purpose of automatically producing a software application (automation computer program 110; FIG. 1) that can be executed by a computer system, in particular an automation system, for example, a programmable logic controller or the like.

At least one process instruction 66 exists in the database 64 for each operating principle 42 allowed as an element of the set 44 of influencing options, for each boundary condition 46 allowed as an element of the set 48 of boundary conditions, and for each allowed combination of an operating principle 42 and a boundary condition 46.

Figure 5:
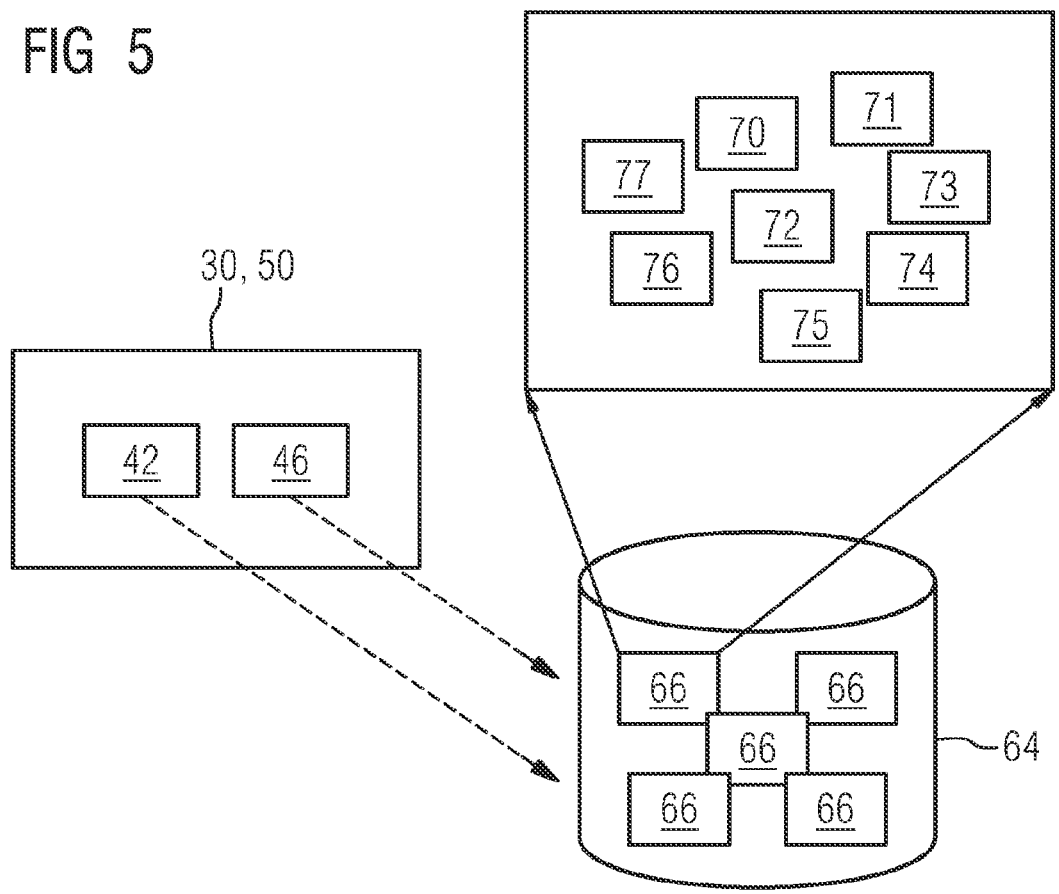
FIG. 5 shows a database containing process instructions for automatic transformation of operational requirements in accordance with the invention.
Figure 5:
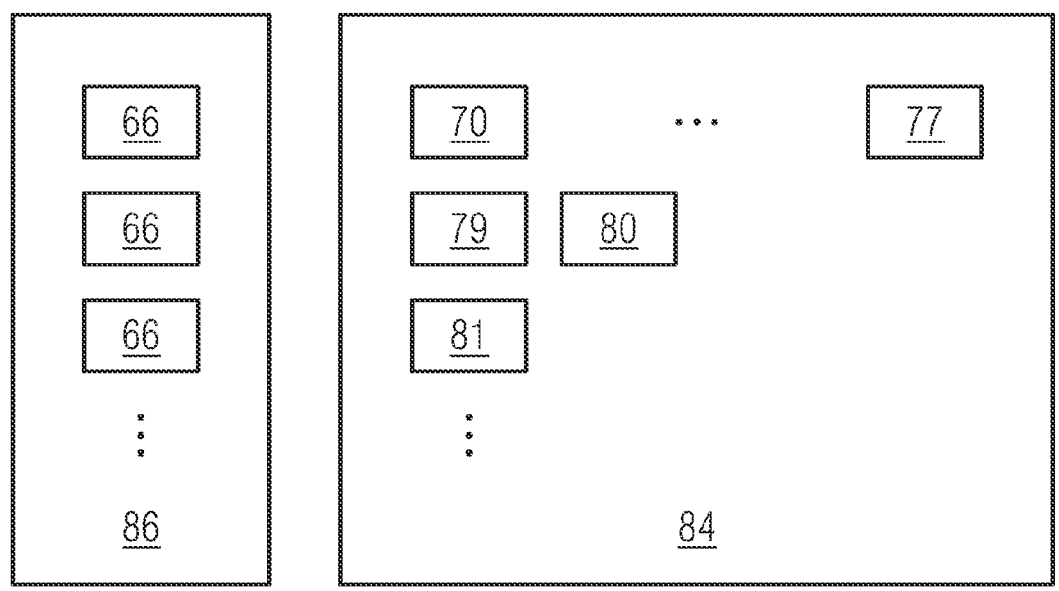

The illustration in FIG. 5 shows in schematically simplified form an operational requirement 30 in the form of the data record 50 encoding the operational requirement 30. The database 64 containing the process instructions 66 held available therein is shown, like the process instructions 66, only in schematically simplified form. For a single process instruction 66, it is shown in schematically simplified form that this comprises data records referred to in the following as process steps 70-77 (each data record encodes a process step), which data records define the transformation of an operational requirement 30, 31 into executable computer program instructions.

Each process instruction 66 comprises or defines a sequence of process steps 70-81 (at least one process step) for automatically building, step by step, a piece of software (automation computer program 110) which is suitable for realizing the required operating principle 42 or the corresponding boundary condition 46.

The illustration in FIG. 5 also shows a set 84 containing process steps 70-81. The set 84 is produced as a result of the automatic successive evaluation of the operational requirements 30, 31 included in the piping diagram 10 during the automatic interpretation of the piping diagram 10. On the basis of an operational requirement 30, 31 (of the respective data record 50) as well as of the included operating principle 42 or of the included operating principle 42 and the or each included boundary condition 46, a suitable process instruction 66 is selected in the database 64. The process steps 70-81 included in the selected process instruction 66 are incorporated into the set 84. The data records 50 are evaluated and said set 84 is formed automatically and by means of an engineering tool 120 (FIG. 7). The set 84 can be formed via an intermediate step whereby firstly a set 86 containing the process instructions 66 selected in the database 64 or references to the selected process instructions 66 is formed and then the set 81 containing the process steps 70-81 is formed in a following step based on the set 86 containing the selected process instructions 66.

Each process step 70-81 defines a use of precisely one building block 88 (FIG. 6) or at least one building block 88 of the automation technology. Automation technology building blocks 88 are known per se. Examples of building blocks 88 in automation technology are controllers (P controllers, PI controllers, PID controllers, etc.), summation points (addsion, subtraction), multiplication points (multiplication, division), delays (PT1 element, PT2 element, etc.), assignments, and so forth. The definition of the use of the at least one building block 88 determines at least one linking of the building block 88 with at least one other building block 88 or with a further data source or sink, an object 12 for example.

Each process step 70-81 comprises a definition of how the respective building block 88 or the respective building blocks 88 is or are to be transformed into an automation computer program 110, for example in that the process step 70-81 comprises corresponding program code instructions, for example program code instructions for a PI control algorithm, or points co such program code instructions. In addition, each process step 70-81 comprises a definition of how the defined use can be transformed into executable computer program instructions, for example in that the process step 70-81 comprises a definition as to how output variables of a building block (e.g., the calculation result of a subtraction point) are to be used as input variables of other building blocks (e.g., control deviation of a control algorithm).

Finally, the know-how of an automation expert is stored in the process instructions 66 or the described process steps 70-81 for the purpose of transforming operational requirements 30, 31 into corresponding automation algorithms.

Each process instruction 66 comprises automatically executable process steps 70-81 (each process instruction 66 includes at least one automatically executable process step 70-81) and the automation software (automation computer program 110) is produced during the execution of the process steps 70-81, which automation software comprises an implementation of the originally underlying operational requirements 30, 31 in the form of computer program instructions executable by means of a respective automation system.

Figure 6:
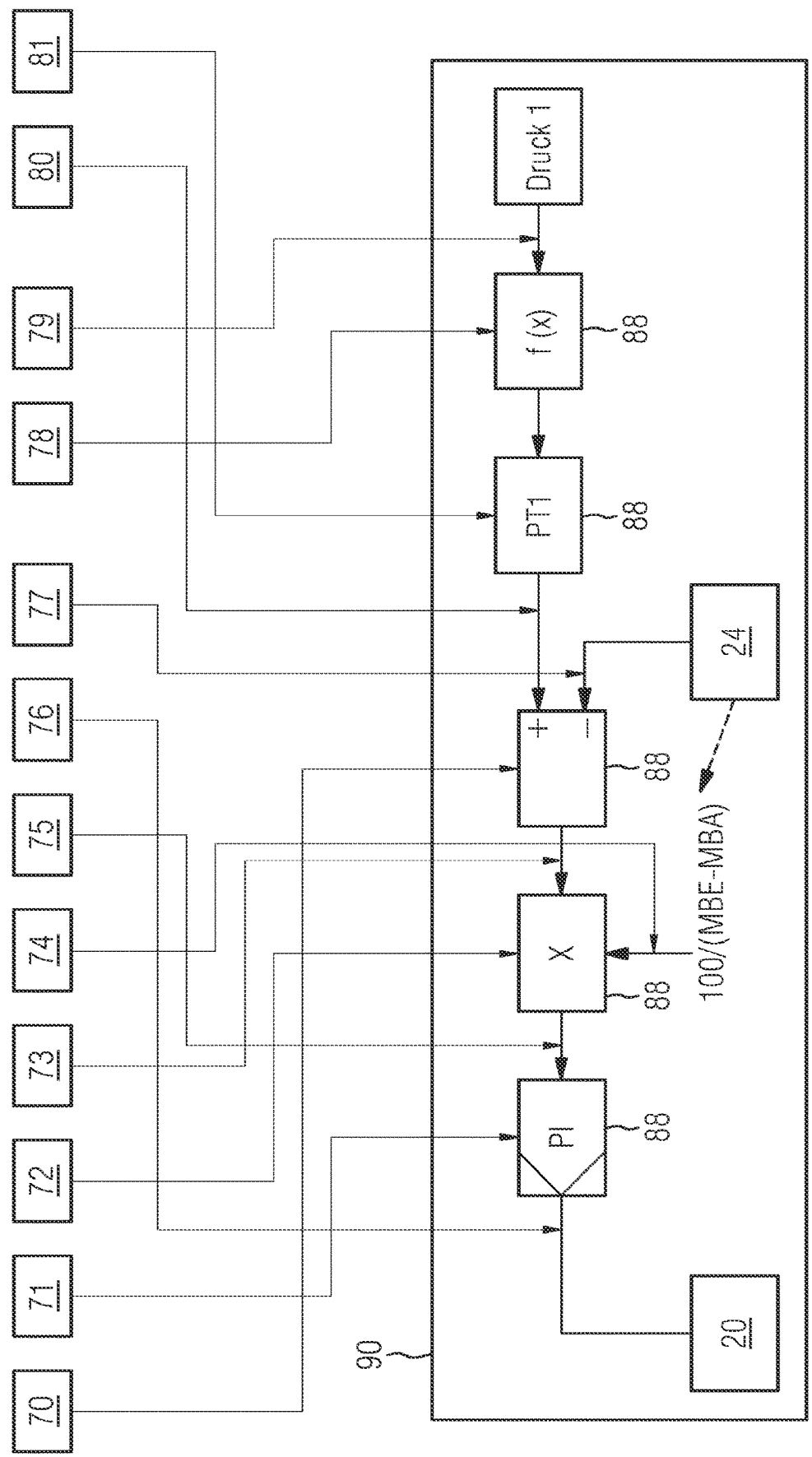
FIG. 6 shows an automation function resulting on the basis of an operational requirement and connecting the objects linked via the operational requirement, which automation function acts as a technological implementation of the underlying operational requirement in accordance with the invention.

The illustration in FIG. 6 shows in schematically simplified form a transformation of the process steps 70-81, specifically the process steps 70-81 selected on the basis of the underlying operational requirements 30, 31, i.e., a transformation of the underlying operational requirements 30, 31 into an automation function 90. The transformation is performed automatically and via an engineering tool 120 (FIG. 7), whereby the engineering tool 120 executes the individual process steps 70-81.

The process instruction 66 for transforming the operating principle 42 "is controlled by" comprises, for example, a sequence of process steps 70-31 as follows: Realize a subtraction 70, Realize a controller 71 (for example, a P controller, i.e. proportional controller, or a PI controller, i.e. proportional-integral PI controller, etc.), Realize a multiplication 72, Use 73 the result of the subtraction as a multiplier of the multiplication 72, Use 74 the value "100/MBE-MBA)" as multiplicand of the multiplication 72, where "MBA" is the start of the measurement range and "MBE" is the end of the measurement range of the sensor 24 from which the operational requirement 30 derives (start of the arrow connection), Use 75 the product of the multiplication 72 as control deviation for the controller 71, and Send 76 the controller output signal as positioning signal to the object 20 at which the operational requirement 30 ends (end of the arrow connection). The process steps 70-81, at any rate at least individual process steps 70-81, therefore also define a connection to and a use of at least one object 12, 20, 24 linked via the operational requirement 30.

The process steps 70, 71, 72 first cited in the preceding paragraph (Realize a subtraction; Realize a controller; Realize a multiplication) each signify and each lead to the creation of an automation technology building block 88 specified in the process step 70, 71, 72 and as a result of being created the building block becomes part of the automatically generated automation software (automation computer program 110), specifically a building block 88 that implements a subtraction, a building block 88 that implements a controller, and a building block 88 that implements a multiplication. The further process steps 73, 74, 75 each signify and each lead to building blocks 88 specified in the process step being "interconnected". The expression "being interconnected" means in this context using data originating from a building block 88 (via an output of the building block 88 connected according to the process step) or supplying a building block 88 with data (via an input of the building block 88 connected according to the process step).

The schematic in FIG. 6 illustrates the function (automation function 90) produced as a result of transformation of the process instruction 66. Here, the database 64 also serves as an inexhaustible "modular building-block system" from which a process instruction 66 is selected in each case based on the respective operating principle 42, the respective boundary condition 46 or a combination of an operating principle 42 and at least one boundary condition 46, and the or each process step 70-81 included therein forms the basis of the resulting automation function 90. The representation of the resulting automation function 90 in FIG. 6 in the form of a function diagram with function blocks serves to provide a better overview and is to be understood as an example. The process steps 70-81 included in the underlying process instructions 66 can be transformed by generation of such function blocks and their interconnection or alternatively also by direct generation of a software code, e.g., of an automation system.

Process instructions 66 are optionally assigned not only to the operating principles 42 of an operational requirement 30, 31, but also to their boundary conditions 46. For example, the boundary condition 46 "opening final control element increases the controlled variable" (positive sign of the control loop) includes a process instruction 66 that comprises a sequence of process steps 70-81 as follows: Use 77 the measured signal of the sensor 24 from which the operational requirement 30 derives as subtrahend of the subtraction 70 and the setpoint value as minuend of the subtraction 70. The boundary condition 46 "opening final control element decreases the controlled variable" (negative sign of the control loop), on the other hand, includes a process instruction 66 that comprises a sequence of process steps 70-81 as follows: Use 77 the measured signal of the sensor 24 from which the operational requirement 30 derives as minuend of the subtraction 70 and the setpoint value as subtrahend of the subtraction 70. Acting as process instruction 66 for the boundary condition "the setpoint value is a function of the pressure 1" (let "pressure 1" in this case be the measured signal of a pressure sensor that is not shown in the example piping diagram in FIG. 2) is a sequence of process steps 70-81 as follows: Realize a general function 78, Use 79 the measured signal of the pressure sensor 1 as argument of the function 78, and Use 80 the function value as minuend or subtrahend of the subtraction 70. Whether the function value is to be used as minuend or subtrahend is determined here, as described above, from the process instruction 66 with respect to the sign of the control loop. Acting as process instruction 66 for the boundary condition "setpoint value change delayed" is a sequence of process steps 70-81 as follows: Realize a delay function 81 (e.g., first-order delay element PT1) between the setpoint value and the subtraction 70. The result of the transformation of the process instructions from the boundary conditions 46 is already shown in the illustration in FIG. 5.

An automation function 90 is generated automatically by evaluation of a respective operational requirement 30, 31, the associated operating principle 42 in each case, and the or each associated boundary condition 46, as well as by transformation of the process instructions 66 associated with the operating principle 42 and boundary condition(s) 46. It should be noted in this context that there may be further operational requirements 30 as well as associated operating principles 42 and boundary conditions 46 which influence the same automation function 90. For example, an operational requirement 30 might state "pressure 2 limits flow rate 1", which means that the control valve 1, although it is intended to regulate the flow rate 1, is to do so only for as long as a specific value (e.g., maximum, value) for the pressure 2 is not exceeded. The transformation of the operational requirement 30 by realization of the corresponding process instructions 66 causes the automation function 90, which was originally generated as a result of the operational requirement 30 "is controlled by", to be modified and extended.

Because at least individual process steps 70-81 effect a link with the objects 12, 20, 24 linked via the underlying operational requirement 30, the automation function 90 generated by the process steps 70-81 is itself also connected to the objects 12, 20, 24 linked via the underlying operational requirement 30.

The linking of the automation function 90 with an object 12 exists, for example, because a building block 88 defined in a process step 70-81 at least receives or receives and processes data that originates from an object 12 acting as data source. The receiving of the data or of precisely one data element is realized, for example, in the form of an access to a data region of the respective object 12. Similarly, the linking of the automation function 90 with an object 12 exists, for example, because a building block 88 defined in a process step 70-81 transmits data to an object 12 acting as data source. The transmitting of the data or of precisely one data element is likewise realized, for example, in the form of an access to a data region of the respective object 12.

In the example explained with reference to FIG. 2, the automation function 90 is connected to the sensor 24 and the valve 20. By accessing the data region of the sensor 24, a measured value recorded by the sensor 24 is available for processing in the region of the automation function 90, and in order to influence the position of the valve 20, a controller output signal generated by means of the automation function 90 is output as a positioning signal to the valve 20, for example, because the positioning signal is written into a data region located there.

As already becomes clear with the aid of the example, the process instructions 66 exert a mutual influence on one another and are not independent of one another. In particular, an automation function 90 chat was generated by transformation of a process instruction 66 can be modified again by transformation of a further process instruction 66. This may include, for example, installing new subfunctions, clearing down data connections already existing for this purpose (represented in FIG. 5 as arrows in the function diagram) again, installing new data connections, or replacing existing subfunctions by others.

For a system (engineering system) that transforms a list of process instructions 66 selected from the database 64 according to one or more operational requirements 30, 31 and their associated operating principles 42 and boundary conditions 46, it is preferably for an order of priority to be defined in the database 64 for the process steps 70-81 included in the process instructions 66 residing therein. The priority may refer to a process instruction 66 and consequently to the process steps 70-81 included therein as a whole and/or to each individual process step 70-81. When setting a priority for a process instruction 66, a relative change to the predefined priority or an absolute, invariable priority may be provided for each process step 70-81 included therein so that here also at least individual process steps 70-81 referring back to one and the same process instruction 66 can be assigned different priorities.

As a result of the order of priority, a process step 70-81 with a higher priority is executed before another process step 70-81 with a lower priority. Initially, during the transformation of the operational requirements 30, 31, the associated process instructions 66 are then determined and compiled. The determined process instructions 66 as well as the process steps 70-81 included therein are each assigned a priority. On the basis of the determined process instructions 66, therefore, there results a set containing process steps 70-81, and within this set the process steps 70-81 are ordered according to their respective priority. Finally, the process steps 70-81 are executed according to the order of priority.

For the process steps 70-81, for example, which are to be applied in order to generate the automation function 90 illustrated in FIG. 6, it is already specified in the database 64 that all the process steps 70-81 of the process instruction 66 for the operating principle 42 "is controlled by" are to be executed with the highest priority, where the order of priority of all the process steps 70-81 within the process instruction is arbitrary. The process step "Use 77 the measured signal of the sensor 24 from which the operational requirement 30 derives as subtrahend of the subtraction 70", which belongs to the process instruction 66 for the boundary condition 46 "opening final control element increases the controlled variable", has the next-higher priority. The process step "Use 77 the measured signal of the sensor 24 from which the operational requirement 30 derives as minuend of the subtraction 70", which belongs to the process instruction 66 for the boundary condition 46 "opening final control element decreases the controlled variable", has a similar priority to the aforementioned process step, in which case it is of no significance which process step has the marginally higher or lower priority. The next process steps in the order of priority are then all the process steps of the process instruction 66 for the boundary condition 46 "the setpoint value is a function of the pressure 1", where the order of priority of the process steps within the process instruction 66 is arbitrary. The process step "Use 77 the setpoint value as minuend of the subtraction 70" from the process instruction 66 for the boundary condition 46 "opening final control element increases the controlled variable" has the next-higher priority. The process step belonging to the process instruction 66 for the boundary condition 46 "setpoint value change delayed" has the lowest priority in the example.

The advantage of the procedure proposed herein is that by choosing one or more operating principles 42 from a predefined set 44 of influencing options and choosing one or more boundary conditions 46 from a predefined set 48 of boundary conditions, the user can define practically any operational requirements 30, 31, which are then transformed automatically into corresponding automation functions 90. As a result, automation functions 90 that were never previously envisioned and defined in their totality by human beings for a specific plant, as described in a piping diagram 10, can also be realized automatically.

The illustration in FIG. 7 shows the previously explained aspects of the innovation proposed herein in the form of a schematically simplified flowchart.

In a first step 100, operational requirements 30, 31 comprising operating principles 42 or comprising operating principles 42 and boundary conditions 46 are defined—by an operator—in a piping diagram 10.

In a second, preferably automatically executed step 102, the defined operational requirements 30, 31 are compiled, in each case together with their operating principles 42 and boundary conditions 46, for automatic further processing. The result of the compilation is a plurality of data records 50, i.e., a plurality of data records 50, each encoding an operational requirement 30, 31. To the extent that such data records 50 are connected to the piping diagram 10 (i.e., the data of the piping diagram 10) during the definition of operational requirements 30, 31, the compilation of data records 50 is produced, for example, by the data records 50 being identified automatically in the data of the piping diagram 10 and extracted from the data of the piping diagram 10. Alternatively, the compilation of data records 50 can also be generated directly and independently of the data of the piping diagram 10 during the definition of operational requirements 30, 31. In any event, a series of data records 50 is available for automatic further processing, as is shown in schematically simplified form in the illustration in FIG. 7 together with the second step 102.

In a third step 104, the series of data records 50 is processed automatically. In the course of this activity, either an automation function 90 is produced based on each data record 50 (a process instruction 66 is selected on the basis of the data record 50; the process instruction 66 comprises process steps 70-81; an execution of the process steps 70-81 generates the automation function 90; cf. FIG. 5 and FIG. 6) or an already generated automation function 90 is modified or extended or two or more already generated automation functions 90 are functionally connected to one another. In the process, a series of automation functions 90 is produced automatically based on the series of data records 50, where the number of resulting automation functions 90 may well be different from the number of data records 50 included in the series of data records 50. The totality of resulting automation functions 90 constitutes an automatically generated automation computer program 110. When such an automation computer program 110 is run, the automation functions 90 included therein are executed.

The automation computer program 110 is the software already mentioned above, which is suitable for realizing the operational requirements 30, 31 and their operating principles 42 and boundary conditions 46. The automation computer program 110 is fully generated when all the data records 50 included in the series of data records 50 have been processed. The processing of all the data records 50 is accomplished via an engineering tool 120 implemented in the form of a computer program, that automatically performs at least the third step 104 shown in FIG. 6, optionally the second and the third step 102, 104. In this regard, the engineering tool 120 is shown in the form of a frame enclosing at least the third step 104.

The engineering tool 120 is formed in a generally per se known manner for automatically performing the method proposed herein via a computer acting as an engineering system and is loaded for that purpose into a memory of the computer.

Although the invention has been illustrated and described in more detail on the basis of the exemplary embodiment, the invention is not limited by the disclosed example or examples and other variations may be derived herefrom by the person skilled in the art without leaving the scope of protection of the invention.

Individual prominent aspects of the description filed here may therefore be briefly summarized as follows: The approach proposed herein enables an automatic interpretation of a piping diagram 10, specifically of a piping diagram 10 comprising objects 12, 20, 22, 24. At least two objects 12, 20-24 in each case are linked with operational requirements 30, 31, an operational requirement 30, 31 being defined on the basis of a predefined set 44 of operating principles 42 as well as on the basis of a predefined set 48 of boundary conditions 46. During the automatic interpretation of the piping diagram 10, the operational requirements 30, 31 included in the piping diagram 10 are successively evaluated. In the process, an automation function 90 is generated for an operational requirement 30, 31 and at least based on an operating principle 42 included as an intended purpose in the respective operational requirement 30, 31, which automation function 90 is connected to the objects 12, 20, 24 linked via the underlying operational requirement 30.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized chat structures and/or elements and/or method steps shown and/or described in connection with any disclosed form or embodiment of the invention may be incorporated in any ocher disclosed or described or suggested form or embodiment as a general matter of design choice. It is the intention, therefore, to be limited only as indicated by the scope of the claims appended hereto.

The invention claimed is:

1. A method for generating automation functions to control a plant by automatically interpreting a piping diagram comprising objects representing physical units of the plant and connections between objects, objects or connections in the piping diagram being linked with operational requirements which specify how one of the objects is influenced via data of another respective object, the method comprising:
    defining operational requirements based on a predefined set of operating principles and based on a predefined set of boundary conditions via an operator in the piping diagram;
    evaluating successively the operational requirements included in the piping diagram via an automatic interpretation of the piping diagram and generating a plurality of data records which each encode one of the operational requirements;
    generating or modifying one or more of the automation functions based on the plurality of data records for one of the operational requirements and based on at least an operating principle included as an intended purpose in the respective operational requirement, or functionally interconnecting a plurality of previously generated automation functions;
    connecting the one or more generated or modified automation functions to the objects linked via the underlying operational requirement; wherein the one or more generated or modified automation functions transform the operational requirements within the piping diagram into automation instructions for automating the plant planning; and
    controlling physical units represented by the objects based on the one or more generated or modified automation functions.

2. The method as claimed in claim 1, wherein the automation function is generated for one of the operational requirements and based on an operating principle included in the respective operational requirement as well as a boundary condition included in the respective operational requirement.

3. The method as claimed in claim 1, wherein the automation function is generated for one of the operational requirements based on a database containing process instructions;
    wherein a process instruction is held available in the database for each operating principle or boundary condition included in one of the operational requirements or each combination of an operating principle with at least one boundary condition,
    wherein an associated process instruction is selected from the database for each operational requirement based on at least one of (i) the operating principle and (ii) boundary condition included therein;
    wherein each process instruction comprises at least one process step, and
    wherein each process step comprises an automatically evaluable definition for the use of at least one building block of the automation technology and for transforming the or each respective building block and its or their use into executable computer program instructions.

4. An engineering tool for automatically executing the method as claimed in claim 1 and having functions for creating and processing a piping diagram or a full conventional functional scope for creating and processing a piping diagram.

5. A non-transitory digital storage medium encoded with program instructions which, when executed by a processor of a computer, causes generation of automation functions to control a plant by automatically interpreting a piping diagram comprising objects representing physical units of the plant and connections between objects, objects or connections in the piping diagram being linked with operational requirements which specify how one of the objects is influenced via data of another respective object, the program instruction comprising:
    program code for defining operational requirements based on a predefined set of operating principles and based on a predefined set of boundary conditions via an operator in the piping diagram;
    program code for evaluating successively the operational requirements included in the piping diagram via an automatic interpretation of the piping diagram and generating a plurality of data records which each encode one of the operational requirements;
    program code for generating or modifying one or more of the automation functions based on the plurality of data records for one of the operational requirements and based on at least an operating principle included as an intended purpose in the respective operational requirement, or functionally interconnecting a plurality of previously generated automation functions;
    program code for connecting the one or more generated or modified automation functions to the objects linked via the underlying operational requirement; wherein the one or more generated or modified automation functions transform the operational requirements within the piping diagram into automation instructions for automating the plant planning; and
    program code for controlling physical units represented by the objects based on the one or more generated or modified automation functions.

* * * * *